(12) United States Patent
Ehmann

(10) Patent No.: US 6,611,158 B2
(45) Date of Patent: Aug. 26, 2003

(54) METHOD AND SYSTEM USING A COMMON RESET AND A SLOWER RESET CLOCK

(75) Inventor: Gregory E. Ehmann, Sleepy Hollow, IL (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/912,146

(22) Filed: Jul. 24, 2001

(65) Prior Publication Data

US 2003/0020524 A1 Jan. 30, 2003

(51) Int. Cl.$^7$ .................................................. H03L 7/00
(52) U.S. Cl. .......................... 327/142; 327/145; 327/99
(58) Field of Search .................................. 327/141, 142, 327/144, 145, 154, 198, 298, 99, 299, 291, 292, 293, 295; 375/354

(56) References Cited

U.S. PATENT DOCUMENTS

| | | | | |
|---|---|---|---|---|
| 4,398,155 A | * | 8/1983 | Atwell, Jr. et al. | 327/144 |
| 4,686,386 A | * | 8/1987 | Tadao | 327/143 |
| 4,771,441 A | * | 9/1988 | Spengler et al. | 375/354 |
| 4,851,710 A | * | 7/1989 | Grivna | 327/155 |
| 5,025,387 A | * | 6/1991 | Frane | 364/493 |
| 5,315,181 A | * | 5/1994 | Schowe | 326/93 |
| 5,461,332 A | * | 10/1995 | Mirov et al. | 327/41 |
| 5,510,740 A | * | 4/1996 | Farrell et al. | 327/142 |
| 5,537,055 A | * | 7/1996 | Smith et al. | 326/8 |
| 5,675,615 A | * | 10/1997 | Watt | 375/354 |
| 5,825,706 A | * | 10/1998 | Snowden et al. | 365/222 |
| 5,847,588 A | * | 12/1998 | McDermott | 327/144 |
| 5,870,404 A | | 2/1999 | Ferraiolo et al. | 371/1 |
| 6,118,314 A | * | 9/2000 | Arnould et al. | 327/141 |
| 6,137,336 A | * | 10/2000 | Baba et al. | 327/295 |
| 6,255,882 B1 | * | 7/2001 | Hirai | 327/291 |
| 6,323,715 B1 | | 11/2001 | Vatinel | 327/407 |
| 6,453,425 B1 | * | 9/2002 | Hede et al. | 713/501 |

* cited by examiner

Primary Examiner—Timothy P. Callahan
Assistant Examiner—Hai L. Nguyen
(74) Attorney, Agent, or Firm—Kevin Simons.

(57) ABSTRACT

The operability and scaleability of electronic circuits is improved using a circuit arrangement that is modular, scaleable, straightforward to implement and allows for simple and safe physical design implementation. According to one example embodiment of the present invention, a reset method and system are used to effect a reset at several peripheral devices that may employ similar and/or different reset strategies. A reset module is coupled to a clock module having an external clock reference and to each of the peripheral devices. Operationally, the clock module provides a functional clock signal to each of the peripheral devices at one of a plurality of first frequencies. The reset module generates an internal reset signal in response to a system reset signal. In response to an internal reset signal, the clock module drives a common reset clock signal, having a reset clock frequency, to each of the peripheral devices via clock outputs at the clock module. The reset clock frequency is equal to or slower than the functional clock frequency provided to each of the peripheral devices. A synchronization module at each of the peripheral devices is adapted to synchronize the reset signal among all peripheral devices using the reset clock signal. The reset module holds the internal reset signal for a selected amount of time, and then releases the clock module from the reset clock signal. The resets are then simultaneously released at each of the peripheral devices, making possible a smooth transition from reset.

19 Claims, 2 Drawing Sheets

METHOD AND SYSTEM USING A COMMON RESET AND A SLOWER RESET CLOCK

FIELD OF THE INVENTION

The present device relates generally to electronic systems and, more particularly, to electronic systems and components benefiting from different reset strategies.

BACKGROUND OF THE INVENTION

The electronics industry continues to strive for high-powered, high-functioning circuits. Significant achievements in this regard have been realized through the fabrication of very large-scale integration of circuits on small areas of silicon wafer. In most modem electronic devices, these circuits have been integrated in large numbers to realize increased capabilities. These efforts have resulted in an ever-increasing proliferation of customized chips, with each chip serving a unique function and application. This, in turn, has lead to various efforts to design and successfully test chips efficiently and inexpensively.

The design and development cycle time for large-scale systems can be shortened by using previously designed components, or modules, and coordinating the functionality of the modules to accommodate the overall design goal of the large-scale systems. Such modules, having been designed for systems having differing reset requirements, often have differing clock and timing constraints. Some modules, for example, employ an asynchronous reset scheme, a synchronous reset scheme or a mix of both. Others employ a positive-edge-triggered clocking scheme, a negative-edge-triggered clocking scheme, a level sensitive scheme, a multi-phased scheme, and so on.

In like manner, the convention used for resetting each module may differ. For each module, the reset strategy employed introduces timing constraints relative to the system's particular clocking scheme. Examples of such timing constraints include: a synchronous reset must arrive at the module for a specified duration before the active edge of the clock and/or be held at its active state for a specified duration after the clock edge; an asynchronous reset should not be released in close proximity to a change of clock state in a level sensitive clocking design; a reset signal should not be asserted, or de-asserted, in close proximity to an assertion or desertion of a set signal; and the release of a reset signal is advantageously effected about simultaneously for all modules. From a systems viewpoint, the varying reset and clocking strategies produce a combinatorial complex set of design constraints.

To accommodate the varying clocking strategies among modules, conventional systems include a module-clock-generator that produces the various clocking signals at appropriate frequency and phase relative to each other for proper system operation. Accommodation of the varying reset strategies is often less structured. Typically, because of the combinatorial nature of the problem, specific reset circuitry is designed for each module, or for each set of modules having a similar combination of reset and clock configurations. While the design of each reset circuit may not be unduly burdensome, the system-level design task of properly defining, configuring, and testing each of these circuits can be significant.

The use of specific, time-dependent, reset circuits also minimizes the likelihood that systems designed with such circuits will "scale" as technologies change, or as other features are added to the system. Similarly, the use of such a system as a future module in a larger system will only exacerbate the problems associated with modules having differing reset strategies and timing constraints.

SUMMARY OF THE INVENTION

The present invention is directed to a reset method and circuit for a clocked logic system that responds to a system reset by driving a common reset and reset clock signal of reduced frequency to each circuit module and controls reset de-assertion with respect to the common reset clock signal, and is particularly useful in addressing applications and problems discussed above. For example, a digital circuit arrangement can control the clock signal to the circuits to provide the clock signal at a first frequency during a reset mode, and at a second frequency after the reset mode, the first frequency being less than the second frequency. The present invention is exemplified in a number of implementations and applications, some of which are summarized below.

According to another example embodiment of the present invention, a plurality of circuit modules adapted to enable internal resets in response to an external reset signal using a method that addresses the previously-discussed applications and problems. A reset mode is initiated (an internal reset signal is asserted) in response to a system reset signal. Clock signals sent to each circuit module are controlled in response to the reset mode. A first frequency is provided during the reset mode as a reset clock signal, and a plurality of second frequencies are provided after the reset mode. The first frequency is at least as slow as the slowest frequency of the plurality of second frequencies. The reset mode is synchronized to the reset clock signal for each circuit module, and the synchronized reset signal is sent to reset each circuit module. When the system reset is disabled, and after a time delay of N reset clock cycles, the reset mode is exited. Each circuit module releases its internal reset when the reset mode is exited.

In a related example embodiment, the present invention is directed to a clocked logic system that is adapted to include a reset for a plurality of circuit modules in a manner. The clocked logic system includes a plurality of digital circuits arranged in a plurality of circuit modules. Each circuit module operates on a clock signal at one of a plurality of first frequencies. A clock module generates a reset clock signal at a second frequency, the second frequency being at least as slow as the slowest frequency of the plurality of first frequencies. A reset logic module controls assertion of an internal reset signal to each circuit module in response to a system reset signal and controls de-assertion of the internal reset signal to each circuit module with reference to the reset clock signal. A clock selector module switches the plurality of circuit modules to operate on the reset clock signal in response to the internal reset signal. A synchronization module is coupled to each one of the plurality of circuit modules and has a reset input port coupled to the reset module. The synchronization modules are adapted to synchronize the internal reset signal to the reset clock signal at each circuit module. The circuit modules are adapted to enable internal resets in response to an internal reset signal.

In another related example embodiment, a reset circuit is adapted to reset a plurality of circuit modules. The reset circuit includes a reset module adapted to generate an internal reset signal in response to a system reset signal, and a clock module having a clock selection switch. The clock module has an external clock reference and at least one clock module output for each of the plurality of circuit modules.

The clock module provides a reset clock signal to each of the circuit modules via the clock module selection switch in response to the generated internal reset signal. The frequency of the clock module is selectable to an external clock reference.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
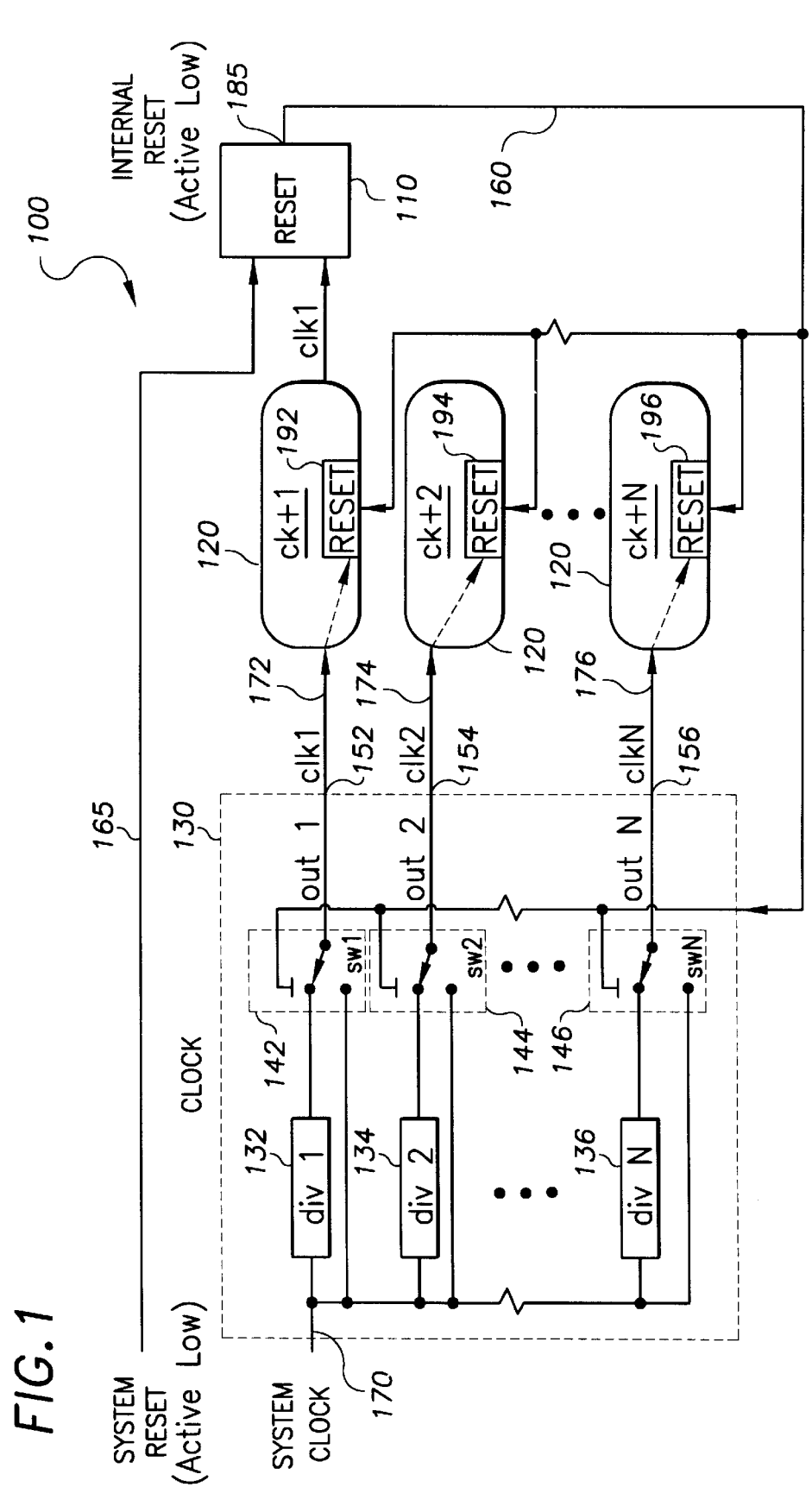
FIG. 1 is a schematic diagram for a circuit reset, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of electronic devices, and has been found to be particularly suited for use in connection with devices exhibiting timing issues due to resets. While the present invention is not necessarily limited to such devices, an appreciation of various aspects of the invention is best gained through a discussion of various examples using this application.

According to an example embodiment of the present invention, a reset method and system are used to effect a reset at a plurality of circuit modules (e.g., peripheral devices). The system includes a reset module coupled to a clock module and to each of the plurality of circuit modules. The clock module is coupled to an external clock reference and to each of the circuit modules via clock selection switches and clock module outputs for the circuit modules. The clock module nominally provides a functional clock signal at one of a plurality of first frequencies to each of the circuit modules. The reset module generates an internal reset signal in response to a system reset signal. The internal reset signal is provided to the clock module and the circuit modules. In response to the internal reset signal, the clock selection switches drive a reset clock signal having a second clock frequency to each of the circuit modules via the clock outputs. The second (reset) clock frequency is at least as slow as any of the first plurality of functional clock frequencies.

Each of the circuit modules includes a synchronization module adapted to synchronize the internal reset signal among all circuit modules using the reset clock signal received from the clock module. The reset module holds the internal reset signal for a selected amount of time after de-assertion of the system reset signal. Upon de-assertion of the internal reset signal, the clock selection switches release the reset clock signal to the circuit modules. The reset signals are simultaneously released at each of the circuit modules.

The reset can be effected using a variety of reset circuit arrangements. FIG. 1 shows one such circuit arrangement, a clocked logic system 100, according to another example embodiment of the present invention. The clocked logic system 100 includes a reset module 110, a plurality of digital circuits arranged in a plurality of circuit modules 120, and a clock module 130. For example, circuit modules 120 are representative of peripheral devices. Peripheral devices cktA, cktB, and cktN are shown in FIG. 1.

The clock module 130 includes clock divider circuits, div1 132, div2 134, and divN 136; clock selector switches, sw1 142, sw2 144, and swN 146; and clock outputs, out1 152, out2 154, and outN 156. Clock signals, clk1 172, clk2 174, and clkN 176 are provided by clock module 130. Clk1 is provided at out1, clk2 is provided at out2, and clk3 is provided at out3. The clock module 130 is adapted to receive an external system clock signal 170, which is provided to each clock divider circuit. Each clock divider circuit is coupled to a clock selector switch, and each clock selector switch is coupled to a clock output respectively as illustrated on FIG. 1. For example, clock divider circuit div1 is coupled to clock selector switch sw1, and clock selector switch sw1 is coupled to clock output out1.

When an internal reset signal 160 is not asserted (i.e., not reset mode), the clock module 130 is adapted to receive an external system clock signal 170, and through the clock divider logic as is known to those skilled in the art, provide a functional clock signal to each of the clock outputs. Each functional clock signal (e.g., clk1, clk2 and clkN) is one of a plurality of first frequencies, each of the plurality of first frequencies being equal to or greater than the external system clock frequency. The functional clock may, for example, include a clock signal having a particular frequency and phase related to requirements at each circuit module and overall system timing constraints. Clock outputs out1 152, out2 154, and outN 156 are adapted to send a clock signal to each of the peripheral devices. Although FIG. 1 shows three peripheral devices and three clock outputs, the system 100 is adaptable to accommodate additional peripheral devices up to an "N" number of devices, as well as clock outputs for each of the peripheral devices. In one embodiment, clk1 172 is chosen to have the longest "insertion delay" (i.e., the length of time the clock propagates from the source to all of the destinations).

When internal reset signal 160 is asserted (i.e., reset mode) the clock module illustrated in FIG. 1 enables an external system (reset) clock on clock module outputs to each of the circuit modules, or peripheral devices. The system clock signal has a frequency that is at least as slow as the slowest functional clock frequency (i.e., at least as slow as the slowest frequency of the first plurality of frequencies). The reset clock is common to each circuit module during reset mode. Therefore, the reset clock frequency provided to each circuit module is equal to or less than the functional frequency for each circuit module. The reset clock signal is used to apply a synchronized internal reset signal at each circuit module.

When the system reset signal 165 is once again de-asserted, the internal reset signal 160 is subsequently de-asserted after N clock cycles at reset module output (node 185). All circuit modules 120 release their resets synchronously, or nearly simultaneously, which improves the ability to effect a safe transfer to system boot. The external system clock signal 170 remains asserted to the circuit modules 120 for a selected period, and the clock module 130 (via the clock selection switches) then switches to the functional clock signals for each module after the reset has been released.

In various implementations, the selected period for which the external system clock 170 is asserted depends on the intended application. For example, the selected period for which the external system clock 170 is asserted can be effected via a register in the clock module 130 that is programmed to hold the external system clock for a number of clock cycles. When the internal reset signal 160 is de-asserted, software in the register operates to switch the clocks from the external system (reset) clock 170 to the functional clocks for each circuit module 120. The switch is effected after a number of clock cycles that allows the circuit module resets to be released before the switch is made. In a more particular implementation, the reset at each circuit module is released two clock cycles after internal reset signal is de-asserted. In this instance, the software uses at least two clock cycles to switch from the reference clock to the functional clocks, and ensures that the circuit module resets are synchronously released using the reset clock reference. In other approaches, the selected period is determined based on a synchronous strategy for recovering the functional clock, as described and illustrated for example in connection with patent documents identified by U.S. application Ser. No. 09/475,697, filed Dec. 30, 1999 (VLSI.280PA) and various other patent documents cited in its prosecution history.

The reset module 110 is adapted to generate and send an internal reset signal 160 to the clock module 130 and to circuit modules 120 (e.g., peripheral devices ckt1, ckt2 and cktN) in response to an input system reset signal 165. Each of the circuit modules 120 include synchronization modules 192, 194, and 196, respectively, each having at least one input port adapted to receive the clock signals, and an input port adapted to receive the internal reset signal 160. Synchronization module 192 receives clock signal clk1; module 194 receives clock signal clk2 and module 196 receives clock signal clkN. During a reset mode, each circuit module receives the same reset clock signal, at a frequency which is equal to or less than each circuit module's functional clock frequency. The synchronization modules use the clock signals and the internal reset signal 160 to generate circuit module resets. Each circuit module reset is synchronized such that each peripheral device is reset using the same clock input, and thus, each device is released from reset nearly simultaneously when the reset is released. The reset circuit and method described herein are applicable to a variety of peripheral devices, each having different reset strategies.

Figure 2A:
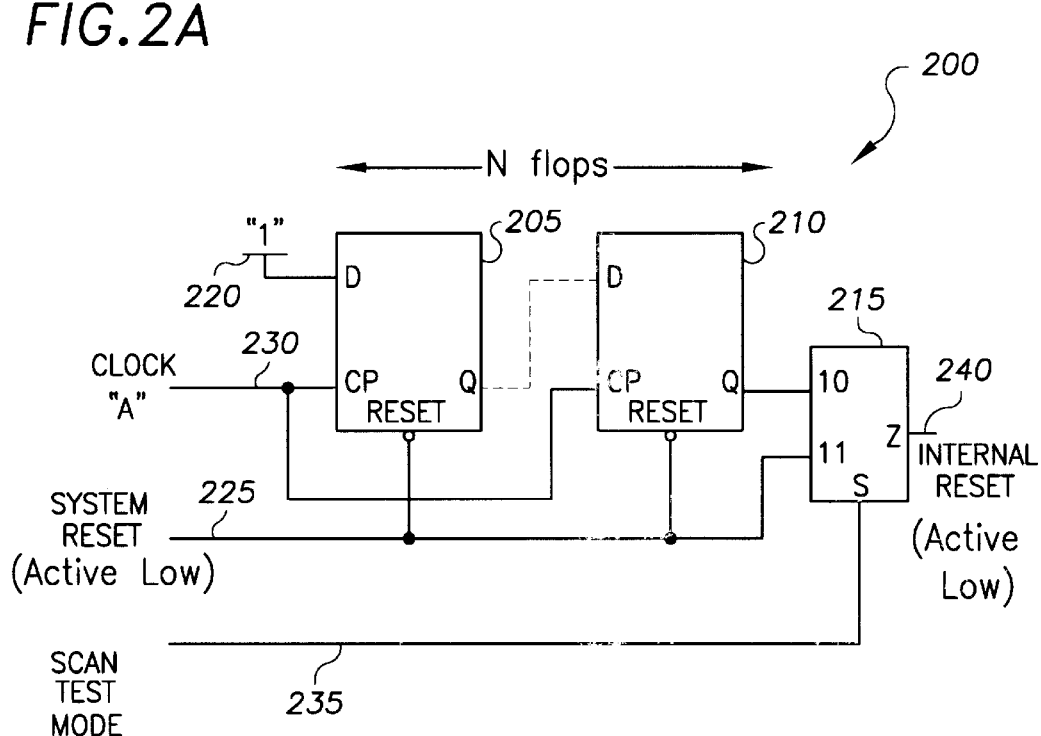
FIG. 2A is a schematic diagram for a reset module, according to an example embodiment of the present invention.

Reset logic can be effected using a variety of reset circuit arrangements. FIG. 2A shows one such circuit arrangement, generally indicated at 200, according to another example embodiment of the present invention. Circuit arrangement 200 has N flip-flops coupled in series as shown, with flip-flop 205 being the first flip-flop and flip-flop 210 being the last flip-flop of the series. The dashed line indicates that up to "N" flip-flops can be included in the series. The output of flip-flop 210 is coupled to AND gate 215. First flip-flop 205 input is hard-coupled to a logical "1" (high) 220. System reset input 225, which is active low in circuit arrangement 200, is received at each flip-flop (i.e., 205 . . . 210) and at AND gate 215. A clock signal 230 is coupled to each flip-flop (i.e., 205 . . . 210) and a scan test mode signal 235 is received at AND gate 215. AND gate 215 provides as an output, internal reset 240.

As will be appreciated by those skilled in the art, when system reset signal 225 transitions low (active or "asserted"), each of N flip-flops (i.e., 205 . . . 210) is reset driving their respective outputs low. Internal reset signal 240 (the output of AND gate 215) is also driven low by system reset signal 225 low, and remains low as long as system reset signal 225 is asserted (i.e., low).

When system reset signal 225 transitions high (inactive or "de-asserted"), clock signal 230 cycles the logical "1" (high) 220 input to flip-flop 205 through the series of flip-flops after system reset signal 225 transitions high. For a series of "N" flip-flops, "N" clock cycles for clock signal 230 to cycle the logical "1" 220 through the series, including last flip-flop 210, to AND gate 215. AND gate 215 de-asserts (AND gate 215 output transitions high) internal reset signal 240 "N" reset clock cycles after system reset signal 225 is de-asserted. Internal reset signal 240 remains de-asserted (high) so long as system reset signal 225 remaining high.

Figure 2B:
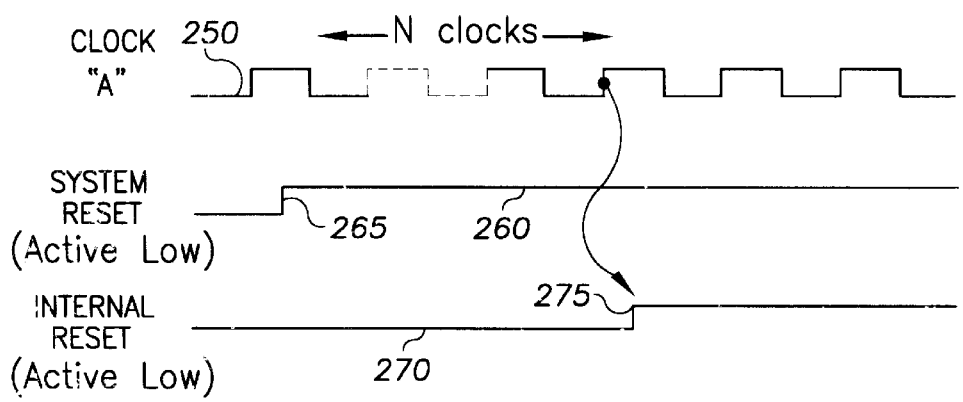
FIG. 2B is a timing diagram for a reset module, according to an example embodiment of the present invention.

The timing of the clock module and the reset at the circuit modules may be effected in a variety of manners. FIG. 2B shows a timing diagram for reset logic 200 of FIG. 2A. Clock signal 230 cycles are shown as curve 250. The system reset input signal 225 (active low) is shown as curve 260, and internal reset signal 240 (active low) is shown as curve 270. FIG. 2B demonstrates the timing for de-assertion of internal reset signal 240, "N" clock cycles after system reset signal 225 is de-asserted.

Various example flow processes can be used for resetting such a circuit, according to the present invention. One such process includes generating an internal reset signal, and providing the signal to a clock module and to two or more circuit modules. All clock outputs from the clock module are enabled at a reference clock frequency. The clock outputs are then received at each circuit module and used to synchronize the reset signal among the circuit modules. The reset is asserted for a selected number of clock periods, and the reset is disabled after the selected number of clock periods has been reached, effecting the simultaneous de-assertion of the reset at each circuit module.

According to another example process, first a system reset signal occurs. The internal reset signal is then asserted so that there is no intentional delay, and the relatively slow (system) clock is driven to all clock ports. The circuitry is rebooted using the slower clock. The system reset signal is then removed. After a delay of "N" clock cycles, the internal reset signal is removed synchronous with the slow clock. A glitchless switch then occurs from the system clock back to the operating clock (speed).

While the present invention has been described with reference to several particular example embodiments, those skilled in the art will recognize that many changes may be made thereto. For example, testing circuitry and logic may be added to various components, such as the synchronization modules. These and other modifications and/or additions may be made without departing from the spirit and scope of the present invention, which is set forth in the following claims.

What is claimed is:

1. In a digital circuit arrangement having circuits that use a clock signal for controlling timing of the circuits and a reset signal for controlling a reset mode of the circuits, a method of mitigating signal timing problems, the method comprising:

controlling the clock signal to the circuits to provide the clock signal at a first frequency during a functional mode, and at a second frequency during the reset mode, the first frequency being greater than the second frequency;

asserting the reset signal to each circuit to initiate the reset mode of each circuit in response to assertion of a system reset signal; and synchronizing the resetting of the circuits by using the clock signal at the second frequency for each circuit during the reset mode and delaying de-assertion of the reset signal to each circuit for a predetermine time period after de-assertion of the system reset signal to delay the exiting of the reset mode.

2. In a digital circuit arrangement having circuits that use a plurality of clock signals for controlling timing of the circuits and a system reset signal for controlling a reset mode of the circuits, a method of mitigating signal timing problems, the method comprising:

initiating the reset mode of each circuit in response to assertion of the system reset signal;

controlling the clock signals to the circuits to provide the clock signals at a plurality of first frequencies during a functional mode, and at a second frequency during the reset mode; and de-asserting the rest mode of each circuit greater than one clock cycle after the system reset signal is de-asserted.

3. The method of claim 2, wherein the second frequency is equal to the lowest frequency of the plurality of first frequencies.

4. The method of claim 2, wherein the second frequency is less than each frequency of the plurality of first frequencies.

5. The method of claim 2, wherein de-asserting the reset mode occurs after at least 6 clock cycles.

6. The method of claim 2, wherein the reset mode is exited in synchronism with the clock signal at the second frequency.

7. A circuit arrangement comprising:

a plurality of circuits each respectively adapted to use a clock signal for controlling timing of the circuits and an internal reset signal for controlling a reset mode of the circuits;

a clock module adapted to control the clock signal to each circuit and to provide the clock signal at a first frequency during the reset mode, and at a second frequency after the reset mode, the first frequency being less than the second frequency; and a reset module adapted to assert the internal reset signal to each circuit in response to assertion of a system reset signal, and to de-assert the internal reset signal to each circuit a plurality of clock signals after the system reset signal is de-asserted.

8. A circuit for use in a clocked logic system operating on a plurality of clock signals and at a plurality of first frequencies, comprising:

a clock module providing a reset clock signal at a second frequency;

means for asserting an internal reset signal to the clocked logic system in response to a system reset signal, the internal reset signal for controlling a reset mode of the clocked logic system;

means for switching the clocked logic system to the reset clock signal in response to assertion of the internal reset signal; and means for de-asserting the internal reset signal to the clocked logic system a plurality of clock cycles after de-assertion of the system reset signal.

9. The circuit of claim 8, wherein the second frequency is at least as slow as the slowest frequency of the plurality of first frequencies.

10. The circuit of claim 9, further comprising:

means for delaying de-assertion of the internal reset signal by N reset clock signal cycles in response to de-assertion of the system reset signal.

11. A method of optimizing reset of a clocked logic system including multiple circuit modules, each circuit module having a clock signal of one of a plurality of first frequencies, the method comprising:

asserting a common reset signal within each circuit module in response to assertion of a system reset signal, the common reset signal initiating a reset mode for each circuit module;

providing a common clock signal, at a second frequency, to each circuit module in substitution for its respective circuit module clock signal in response to assertion of the common reset signal; and each circuit module asserting the common reset signal for a plurality of clock signals after de-assertion of the system reset signal.

12. The method of claim 11, further comprising: synchronously switching from the common clock signal, to the circuit module clock signal in response to de-assertion of the common reset signal within each circuit module.

13. The method of claim 12, wherein the second frequency is at least as slow as the slowest frequency of the plurality of first frequencies.

14. The method of claim 13, wherein the second frequency is equal to the slowest frequency of the plurality of first frequencies.

15. The method of claim 13, wherein the second frequency is slower than the slowest frequency of the plurality of first frequencies.

16. A digital circuit arrangement for mitigating signal timing problems, comprising:

a plurality of circuits each respectively adapted to use a clock signal for controlling timing of the circuit and an internal reset signal for controlling a reset mode of the circuit, each internal reset signal being asserted in response to assertion of a system reset signal;

a clock module adapted to control the clock signal to each circuit and to provide the clock signal at a first frequency during the reset mode, and at a second frequency after the reset mode, the first frequency being less than the second frequency; and a reset module adapted to de-assert the internal reset signal a plurality of clock signals after the system reset signal is de-asserted.

17. A clocked logic system, comprising:

a plurality of digital circuits arranged in a plurality of circuit modules, each circuit module operating on a clock signal at one of a plurality of first frequencies;

means for generating a reset clock signal at a second frequency, the second frequency being at least as slow as the slowest frequency of the plurality of first frequencies;

means for asserting an internal reset signal to each circuit module in response to a system reset signal, the internal reset signal for controlling a reset mode of each circuit module;

means for switching the plurality of circuit modules to operate on the reset clock signal in response to assertion of the internal reset signal, and to operate on the clock at the one of the plurality of first frequencies in response to de-assertion of the internal reset signal; and means for de-asserting the internal reset signal to each circuit module a plurality of clock cycles after de-assertion of the reset clock signal.

18. A circuit arrangement comprising:

a plurality of circuits each having a synchronization module adapted to use a clock signal for controlling timing of the circuits and an internal reset signal for controlling a reset mode of the circuits;

a clock module adapted to control the clock signal to each circuit and to provide the clock signal at a first frequency during the reset mode, and at a second frequency after the reset mode, the that frequency being less than the second frequency; and a reset module adapted to assert the internal reset signal to each circuit in response to assertion of a system reset signal, and to de-assert the internal reset signal to each circuit a plurality of clock signals after the system reset signal is de-asserted.

19. The circuit arrangement of claim 18, wherein each of said synchronization modules are synchronized with each other such that each of said plurality of circuits is nearly simultaneously released from reset.

* * * * *